United States Patent
Kawano et al.

(10) Patent No.: US 9,694,700 B2
(45) Date of Patent: Jul. 4, 2017

(54) CHARGING MANAGEMENT SYSTEM

(71) Applicants: KABUSHIKI KAISHA TOSHIBA, Minato-ku (JP); TOSHIBA SOLUTIONS CORPORATION, Kawasaki-shi (JP)

(72) Inventors: Shinichiro Kawano, Kawasaki (JP); Hiroyuki Suzuki, Hino (JP); Makoto Kano, Hachioji (JP); Yasuomi Une, Kawasaki (JP); Junichi Yamamoto, Fuchu (JP); Norikazu Hosaka, Higashiyamato (JP); Satoshi Sekine, Sagamihara (JP); Tsuyoshi Shimada, Mitaka (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 306 days.

(21) Appl. No.: 14/622,256

(22) Filed: Feb. 13, 2015

(65) Prior Publication Data
US 2015/0158393 A1    Jun. 11, 2015

Related U.S. Application Data

(63) Continuation of application No. PCT/JP2013/072009, filed on Aug. 16, 2013.

(30) Foreign Application Priority Data

Aug. 17, 2012 (JP) ................................. 2012-180867

(51) Int. Cl.
*H02J 7/00* (2006.01)
*B60L 11/18* (2006.01)
(Continued)

(52) U.S. Cl.
CPC ........... *B60L 11/1809* (2013.01); *B60L 11/18* (2013.01); *G01C 21/26* (2013.01); *G06Q 10/04* (2013.01);
(Continued)

(58) Field of Classification Search
CPC .............. B60L 11/1838; B60L 2230/00; B60L 2230/34; H02J 7/0027; Y02T 90/125; Y02T 90/164; Y02T 90/165; Y02T 90/166
(Continued)

(56) References Cited

U.S. PATENT DOCUMENTS

2006/0114114 A1* 6/2006 Nakano .................. G08B 21/16
340/632
2010/0217485 A1* 8/2010 Ichishi ................ B60L 11/1824
701/36
(Continued)

FOREIGN PATENT DOCUMENTS

CN    101952137 A    1/2011
CN    102377220 A    3/2012
(Continued)

OTHER PUBLICATIONS

Combined Office Action and Search Report issued Jun. 15, 2016 in Chinese patent Application No. 201380044194.9.
(Continued)

*Primary Examiner* — Arun Williams
(74) *Attorney, Agent, or Firm* — Oblon, McClelland, Maier & Neustadt, L.L.P.

(57) ABSTRACT

According to one embodiment, there is provided a charging management system. Based on an estimated duration from a time when an electric vehicle having arrived at each of a charging facilities starts charging until the charging is complete, the system determines the charging facility a charging (Continued)

facility utilization of which is to be recommended to be one of the charging facilities related to a path to a destination which has a shortest maximum wait time from a time when a plurality of electric vehicles arrive at the charging facility until the charging is complete, and reports information indicative of the determined charging facility to the electric vehicle not having arrived at the charging facility.

3 Claims, 16 Drawing Sheets

(51) Int. Cl.
| | | |
|---|---|---|
| G01C 21/26 | (2006.01) | |
| G06Q 10/04 | (2012.01) | |
| G06Q 10/06 | (2012.01) | |
| G06Q 50/06 | (2012.01) | |

(52) U.S. Cl.
CPC ... *G06Q 10/0631* (2013.01); *G06Q 10/06315* (2013.01); *H02J 7/0027* (2013.01); *G06Q 50/06* (2013.01); *Y02T 10/7055* (2013.01)

(58) Field of Classification Search
USPC .......................................................... 320/109
See application file for complete search history.

(56) References Cited

U.S. PATENT DOCUMENTS

| | | | |
|---|---|---|---|
| 2010/0228415 A1* | 9/2010 | Paul ........................ | B60L 8/003 701/22 |
| 2011/0071932 A1 | 3/2011 | Agassi et al. | |
| 2012/0059533 A1 | 3/2012 | Oh et al. | |
| 2012/0136574 A1 | 5/2012 | Kobayashi et al. | |
| 2012/0194346 A1 | 8/2012 | Tsai et al. | |
| 2012/0290506 A1* | 11/2012 | Muramatsu ........ | G01C 21/3469 705/412 |
| 2013/0035804 A1 | 2/2013 | Nakazawa | |
| 2013/0204471 A1* | 8/2013 | O'Connell .............. | H02J 3/008 701/22 |
| 2015/0202976 A1* | 7/2015 | Bridges ............... | B60L 11/1842 320/109 |

FOREIGN PATENT DOCUMENTS

| | | |
|---|---|---|
| CN | 102387191 A | 3/2012 |
| CN | 102460073 A | 5/2012 |
| CN | 102622907 A | 8/2012 |
| JP | 2011-24335 A | 2/2011 |
| JP | 2011-27433 A | 2/2011 |
| JP | 2011-191109 A | 9/2011 |
| JP | 2012-003391 A | 1/2012 |
| JP | 2012-048286 A | 3/2012 |
| WO | WO 2011/132583 A1 | 10/2011 |

OTHER PUBLICATIONS

Owen Worley, et al., "Simultaneous Vehicle Routing and Charging Station Siting for Commercial Electric Vehicles" IEEE, Power and Energy Society General Meeting, Jul. 29, 2011, 3 Pages.
Xu Fan, et al., "Brief study on Layout Designs for Electric Car Charging Stations" East China Electric Power, vol. 37, No. 10, Oct. 31, 2009, pp. 1678-1682 (with English Abstract).
Ren Yulong, et al., "Study on Optimized Distribution and Dimension of Electric Car Charging Stations" Automatization of Power System, vol. 35, No. 14, Jul. 25, 2011, pp. 53-57 (with English Abstract).
Li Ruqi, et al. "Queueing Theory-Based Optimization of Electric Car Charging Facility Installation" Automatization of Power System, vol. 35, No. 14, Jul. 25, 2011, pp. 58-61 (with English Abstract).
Liu Zhipeng, et al., "Optimized Location Selection and Constant Capacity of Distributed Power Source for Plug-In Electric Cars" Automatization of Power System, vol. 35, No. 18, Sep. 25, 2011, pp. 11-16 (with English Abstract).
Zhenhong Lin, et al. "The Fuel-Travel-Back Approach to Hydrogen Station Siting" Elsevier, International Journal of Hydrogen Energy, vol. 33, No. 12, Mar. 14, 2008, pp. 3096-3101.
Christophe Guille, et al., "A Conceptual Framework for the Vehicle-to-Grid (V2G) Implementation" Elsevier, Energy Policy, vol. 37, No. 11, Jun. 13, 2009, pp. 4379-4390.
Michael Kuby, et al., "Optimization of Hydrogen Stations in Florida Using the Flow-Refueling Location Model" Elsevier, International Journal of Hydrogen Energy, vol. 34, No. 15, Jun. 24, 2009, pp. 6045-6064.
Qinglai Guo, et al., "Research on Architecture of ITS Based Smart Charging Guide System" IEEE, Power and Energy Society General Meeting, Jul. 29, 2011, pp. 1-5.
Yutaka Ota, et al., "Autonomous Distributed V2G (Vehicle-to-Grid) Satisfying Scheduled Charging" IEEE, Transactions on Smart Grid, vol. 3, No. 1, Mar. 31, 2012, pp. 559-564.
International Search Report issued Nov. 19, 2013 for PCT/JP2013/072009 filed on Aug. 16, 2013 with English Translation.
Written Opinion issued Nov. 19, 2013 for PCT/JP2013/072009 filed on Aug. 16, 2013.
Extended Search Report issued Mar. 10, 2016 in European Patent Application No. 13879374.0.

* cited by examiner

| Id | EV3 |
|---|---|
| Current location | Point 1 km away from IC1 |
| Target IC | IC6 |
| Charging amount | 17kwh |
| Battery capacity | 24kwh |

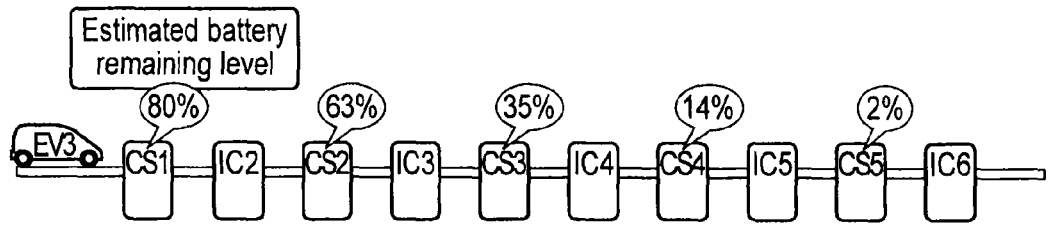
FIG. 5
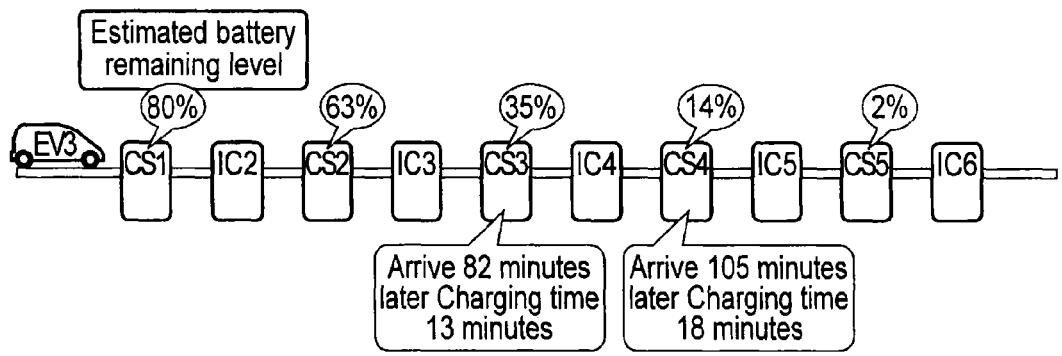
FIG. 6
| EV3 | | |
|---|---|---|
| | Candidate 1 | Candidate 2 |
| Charging station | CS3 | CS4 |
| Arrival time | 82 minutes later | 98 minutes later |
| Recommended charging time | 13 minutes | 18 minutes |
FIG. 7

| EVId | EV1 | EV2 |
|---|---|---|
| Charging station | CS3 | CS4 |
| Arrival time | 70 minutes later | 92 minutes later |
| Recommended charging time | 14 minutes | 26 minutes |

F I G. 8

| EVId | EV3 | | EV4 | | EV5 | | EV6 | | EV7 | |
|---|---|---|---|---|---|---|---|---|---|---|
| Candidate | Candidate1 | Candidate2 | Candidate1 | Candidate2 | Candidate1 | Candidate2 | Candidate1 | Candidate2 | Candidate1 | Candidate2 |
| Charging station | CS3 | CS4 | CS3 | CS4 | CS3 | CS4 | CS5 | CS6 | CS1 | CS2 |
| Arrival time | 82 minutes later | 98 minutes later | 88 minutes later | 116 minutes later | 96 minutes later | 130 minutes later | 102 minutes later | 120 minutes later | 12 minutes later | 34 minutes later |
| Recommended charging time | 13 minutes | 18 minutes | 12 minutes | 19 minutes | 15 minutes | 22 minutes | 12 minutes | 21 minutes | 22 minutes | 30 minutes |

F I G. 9

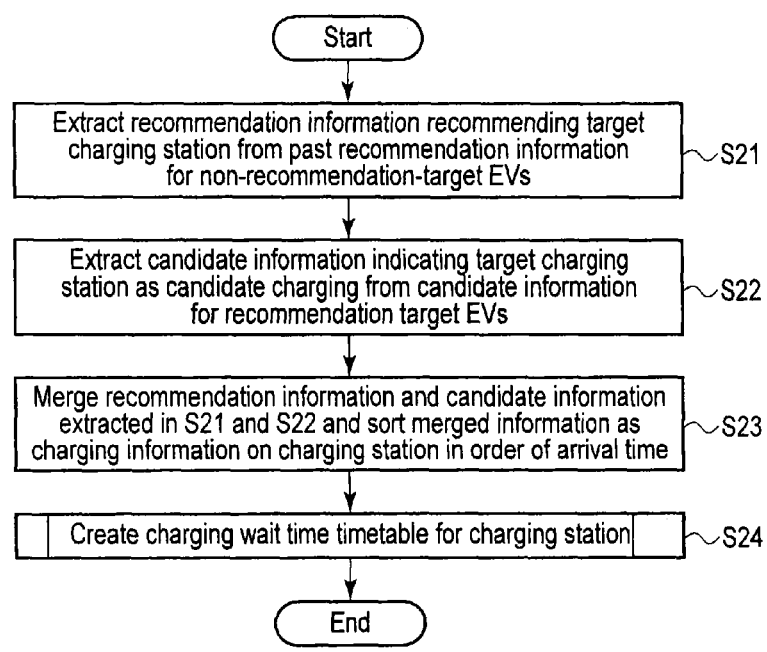
F I G. 10

| Point in time | 70 | 75 | 80 | 85 | 90 | 95 | 100 | 105 | 110 | 115 | 120 | 125 | 130 |
|---|---|---|---|---|---|---|---|---|---|---|---|---|---|
| Wait time | 14 | 9 | 4 | 12 | 19 | 14 | 24 | 19 | 14 | 9 | 4 | 0 | 0 |

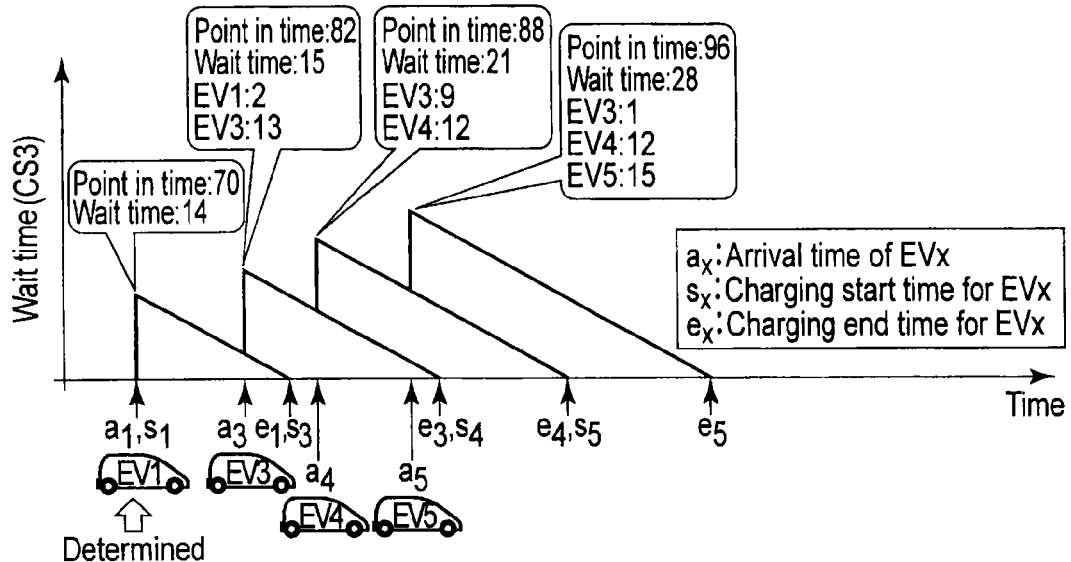
F I G. 13
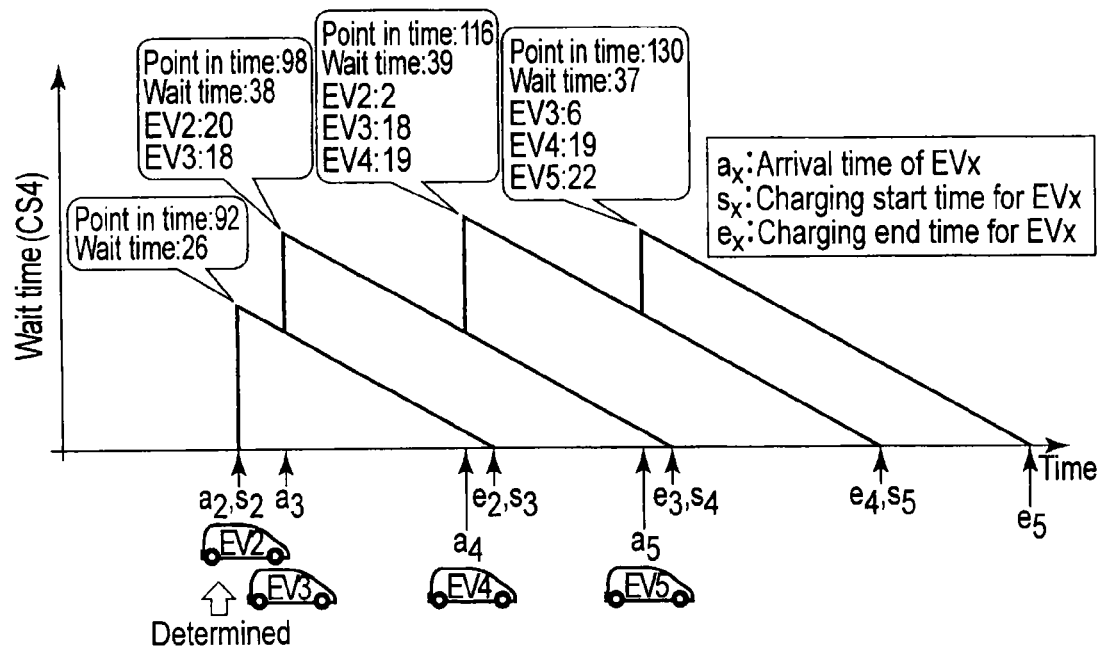
F I G. 14

| EVId | EV3 | EV4 | EV5 |
|---|---|---|---|
| Candidate | Candidate1 | Candidate1 | Candidate2 |
| Charging station | CS3 | CS3 | CS4 |
| Arrival time | 82 minutes later | 88 minutes later | 130 minutes later |
| Recommended charging time | 13 minutes | 12 minutes | 22 minutes |

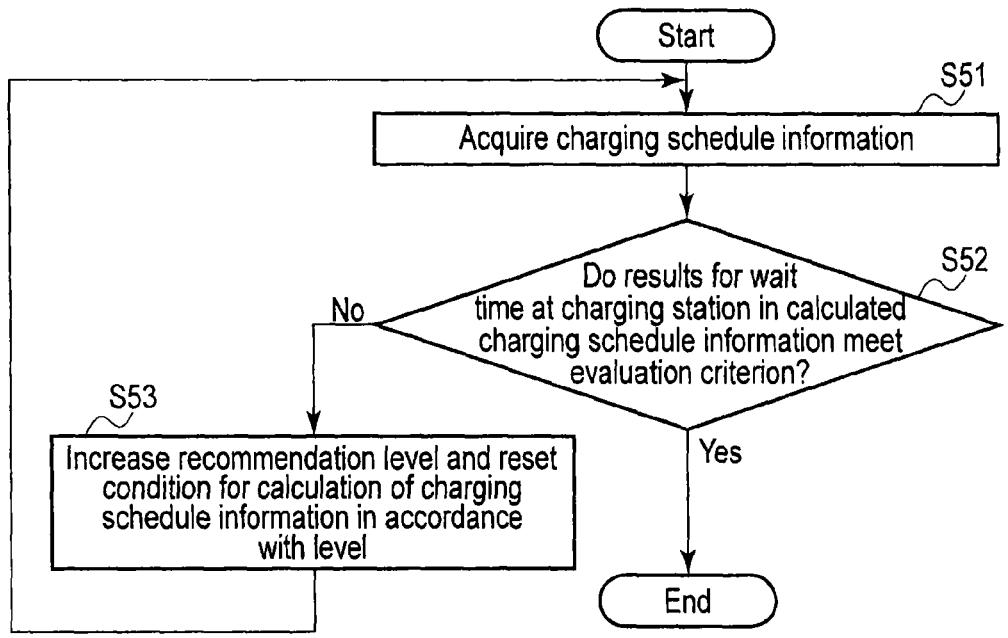

FIG. 23

| Criterion name | Contents |
| --- | --- |
| Maximum wait time CS | Rejected when maximum wait time among all CSs exceeds 60 minutes |
| Maximum wait time EV | Rejected when maximum wait time among all EVs exceeds 60 minutes |
| Inter-CS wait time standard deviation | Rejected when standard deviation of maximum wait time among all CSs exceeds 20 |
| Inter-EV wait time standard deviation | Rejected when standard deviation of maximum wait time among all EVs exceeds 20 |

FIG. 24

| Recommen-dation level | Selection criteria for target EVs | | | | Determination criteria for charging candidates | | |
|---|---|---|---|---|---|---|---|
| | Assignment determination | Recommendation notification | Recommendation notification change time limit | Travel and stop | Charging station | Charging time |
| 1 | Only EVs to which CS has not been assigned | Only EVs not having received notification | Only EVs not having exceeded time limit | Only traveling EVs | Farthest and second farthest stations | Full charge |
| 2 | All EVs | Only EVs not having received notification | Only EVs not having exceeded time limit | Only traveling EVs | Farthest and second farthest stations | Full charge |
| 3 | | | | | Farthest and second farthest stations | Full charge |
| 4 | All EVs | All EVs | | | Farthest and third farthest stations | Full charge |
| 5 | | | Only EVs not having exceeded time limit | Only traveling EVs | Farthest and third farthest stations | EVs assigned to charging station having failed to meet criterion in last evaluation are charged enough to reach second station ahead and other EVS are fully charged |
| 6 | All EVs | All EVs | | Only traveling EVs | Farthest and third farthest stations | EVs assigned to charging station having failed to meet criterion in last evaluation are charged enough to reach next station ahead and other EVS are fully charged |
| 7 | All EVs | All EVs | | | Farthest and third farthest stations | EVs assigned to charging station having failed to meet criterion in last evaluation are charged enough to reach next station ahead and other EVS are fully charged |
| 8 | | | | All EVs | Farthest and third farthest stations | EVs assigned to charging station having failed to meet criterion in last evaluation are charged enough to reach next station ahead and other EVS are fully charged |
| 9 | All EVs | All EVs | | All EVs | Farthest and third farthest stations | EVs assigned to charging station having failed to meet criterion in last evaluation are charged enough to reach next station ahead and other EVS are charged enough to reach second station ahead |
| 10 | | | | | Farthest and third farthest stations | All EVs are charged enough to reach next station ahead |

F I G. 25

| EVId | EV1 | EV2 | EV3 |
|---|---|---|---|
| Charging station | CS2 | CS3 | CS4 |
| Arrival time | 24 minutes later | 54 minutes later | 68 minutes later |
| Recommended charging time | 13 minutes | 12 minutes | 21 minutes |

CHARGING MANAGEMENT SYSTEM

CROSS-REFERENCE TO RELATED APPLICATIONS

This application is a Continuation application of PCT Application No. PCT/JP2013/072009, filed Aug. 16, 2013 and based upon and claiming the benefit of priority from Japanese Patent Application No. 2012-180867, filed Aug. 17, 2012, the entire contents of all of which are incorporated herein by reference.

FIELD

Embodiments described herein relate generally to a charging management system that manages charging of an electric vehicle.

BACKGROUND

Conventionally, electric vehicles (hereinafter referred to as "EVs", which in the present specification are not necessarily limited to four-wheeled vehicles but also include two-wheeled vehicles, three-wheeled vehicles, and externally chargeable plug-in hybrid vehicles) are available.

The time needed to charge an EV is longer than the time needed to fill a gas tank of an internal combustion vehicle. Thus, it is expected that, with the prevalence of EVs, an increasing number of EVs have to wait for charging at charging stations. Thus, the EVs need information indicative of charging stations with few waiting EVs or recommended charging sites for users.

As conventional techniques, first, a traffic navigation system has been disclosed which informs an EV of optimum charging stations included in charging stations that can be reached by the EV and meeting predetermined conditions for the EV, based on a remaining battery level transmitted by the EV.

Moreover, a charging reservation server has been disclosed which allows the optimum charging station to be reserved by estimating the distance that an EV can travel based on the remaining battery level and history of traveling transmitted by the EV and searching for charging stations that can be reached by the EV.

Furthermore, a control system has been disclosed which invites those of the EVs managed by the control system which desire charging, assigns the EVs applying for charging to respective charging stations according to the power supply-demand balances of the charging stations, and guides the EVs to the respective charging stations.

The conventional techniques include some techniques for selecting an appropriate charging station for an EV and guiding the EV to the charging station. However, these techniques only determine a charging schedule for a single EV without taking the situations of other EVs into account.

However, public charging stations are shared by a plurality of EVs. In generally possible sharing forms such as a first-come-first-served basis and an order-of-reservation basis, the time needed to charge each EV, including a charging wait time for the EV, is closely related to times and places for the charging of other EVs. Thus, to determine an appropriate charging schedule for each of the EVs present within a certain road range, a technique is needed which selects an appropriate one of combinations of all the EVs with all the charging stations.

BRIEF DESCRIPTION OF DRAWINGS

FIG. 5 is a diagram depicting an example of results of calculation of an estimated value of a battery remaining level obtained when the EV arrives at each charging station;

FIG. 6 is a diagram depicting an example of the result of selection of a charging station performed by the charging candidate calculation section 51;

FIG. 7 is a diagram depicting the results of calculation of charging candidates for an EV3 performed by the charging candidate calculation section 51;

FIG. 8 is a diagram depicting an example of charging station recommendation information reported to an EV1 and EV2, in a table form;

FIG. 9 is a diagram depicting an example of charging station recommendation information for the EV3, an EV4, an EV5, an EV6, and an EV7, in a table form;

FIG. 10 is a flowchart depicting an example of a procedure for the operations of a charging station wait time timetable creation section 52 in the charging station recommendation system according to the embodiment;

FIG. 13 is a diagram depicting the wait time timetable created for a CS3 by the wait time timetable creation section 52, in a graph form;

FIG. 14 is a diagram depicting the wait time timetable created by the wait time timetable creation section 52, in a graph form;

FIG. 23 is a flowchart depicting an example of a procedure for the operations of a recommendation level determination section 55 of the charging station recommendation system according to the embodiment;

FIG. 24 is an example of evaluation criteria for the results for the wait time at the charging station;

FIG. 25 is a diagram depicting an example of selection criteria for a recommendation target EVs and determination criteria for the charging candidates with respect to the recommendation level, in a table form;

DETAILED DESCRIPTION

In general, according to one embodiment, there is provided a charging management system including a vehicle information collection section configured to collect vehicle information including a battery remaining level, a current location, and a destination for each of a plurality of electric vehicles; a facility information collection section configured to collect facility information including locations of charging facilities for the electric vehicles on a road; a calculation section configured to: (a) calculate, for each of the electric vehicles, a time of arrival at each of the charging facilities related to a path to the destination and an estimated value for the battery remaining level in a case of arrival at the charging facility, based on the information collected by the vehicle information collection section and the information acquired by the facility information collection section, and (b) calculate, based on the calculated battery remaining level, candidates for a charging facility utilization of which is to be recommended which are included in the charging facilities related to the path to the destination of each of the electric vehicles and an estimated duration from a time when an electric vehicle having arrived at each of the charging facilities starts charging and until the charging is complete; a determination section configured to determine the charging facility the utilization of which is to be recommended to be one of the charging facilities related to the path to the destination which has a shortest maximum wait time from a time when the plurality of electric vehicles arrive at the charging facility until the charging is complete, based on a determination result from the calculation section; and a notification system configured to report information indicative of the charging facility determined by the determination section to the electric vehicle not having arrived at the charging facility.

An embodiment will be described with reference to the drawings.

A charging station recommendation system according to the embodiment determines a charging station to be utilized by a user and a scheduled charging time at the charging station, as a schedule for charging of an EV. In determining the scheduled charging time, the system determines the scheduled charging time for each EV by comparing charging schedules for charging stations together, which correspond to combinations of a plurality of EV charging candidates, instead of determining the scheduled charging time only for a single EV.

Figure 1:
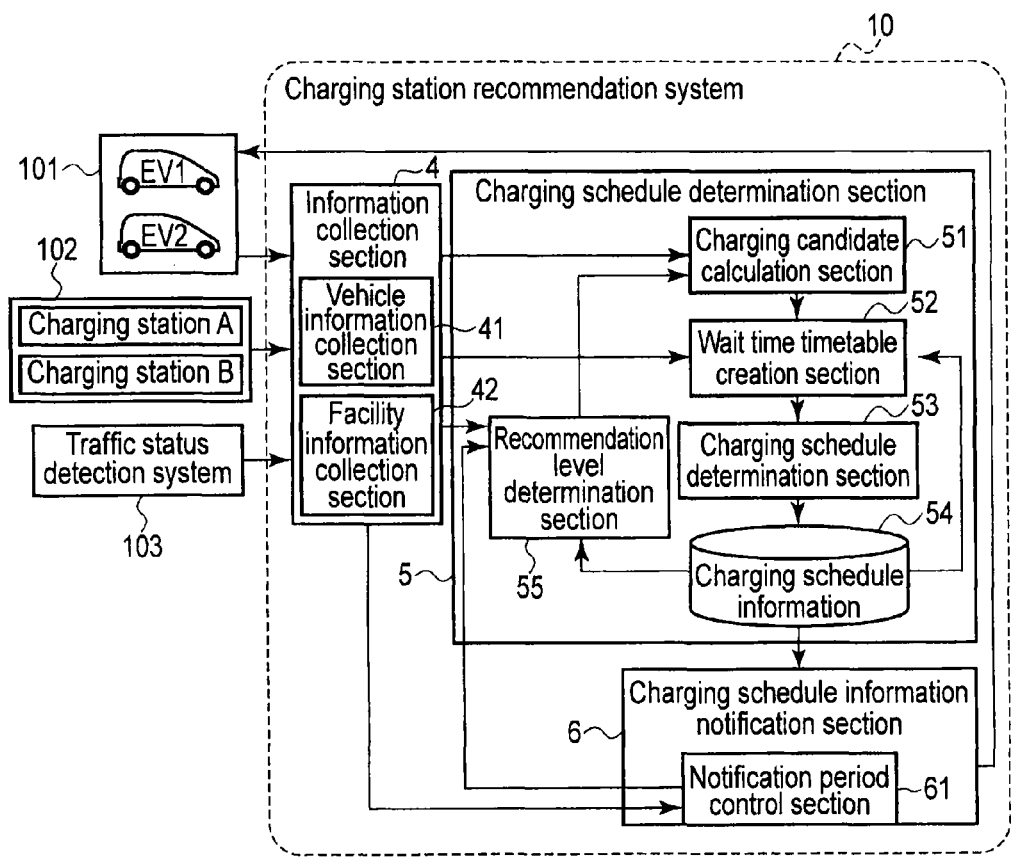
FIG. 1 is a block diagram depicting a configuration example of a charging station recommendation system according to an embodiment.

FIG. 1 is a block diagram depicting a configuration example of a charging station recommendation system according to the embodiment.

As depicted in FIG. 1, a charging station recommendation system 10 includes an information collection section 4, a charging schedule determination section 5, and a charging schedule information notification section 6.

The information collection section 4 includes a vehicle information collection section 41 and a facility information collection section 42. The vehicle information collection section 41 of the information collection section 4 collects current location data, a battery remaining level, a full charging capacity, and information on a destination from a traveling EV 101 as vehicle information, and stores the vehicle information in an internal memory.

Furthermore, the facility information collection section 42 of the information collection section 4 collects charging capacity data such as a charging rate from each of a plurality of charging stations 102 as facility information and stores the facility information in an internal memory.

Additionally, the information collection section 4 collects information indicative of the traffic statuses of roads from an external traffic status detection system 103, and stores the information in an internal memory. In addition, the information collection section 4 prestores map information and the like in the internal memory as fixed data.

The charging schedule determination section 5 determines a recommended charging schedule for those of traveling EVs to which the utilization of a charging station is to be recommended, based on the information collected by the information collection section 4. The charging schedule is information allowing identification of a charging station intended to provide charging and a charging time at the charging station.

The charging schedule determination section 5 includes a charging candidate calculation section 51, a charging station wait time timetable creation section 52, a charging schedule determination section 53, a charging schedule information storage section 54, and a recommendation level determination section 55. The charging candidate calculation section 51, the charging station wait time timetable creation section 52, and the charging schedule determination section 53 have a function to calculate the charging time. The recommendation level determination section 55 has a function to determine a reference for calculation of the charging time. Furthermore, the recommendation level determination section 55 evaluates a calculated charging schedule in accordance with a predetermined evaluation criterion.

The charging schedule information notification section 6 reports the charging schedule calculated by the charging schedule determination section 5 to each of the EVs to which the utilization of a charging station related to the charging schedule is to be recommended.

The charging schedule information notification section 6 includes a notification time control section 61. A timing for notifying each EV of a charging schedule is determined taking into account the vehicle information on the vehicle and the traffic status collected by the information collection section 4.

Now, further detailed operations of the charging candidate calculation section 51, the charging station wait time timetable creation section 52, and the charging schedule determination section 53 will be described below.

The charging candidate calculation section 51 determines a charging schedule for all the EVs to which recommendations are to be made. The charging schedule is a combination of a charging station where the EV may be charged, time needed to arrive at the charging station, and a scheduled charging time at the charging station. For one EV, one or more charging schedules are present based on a reference for a recommended charging schedule. The charging candidate calculation section 51 determines all of the charging schedules as charging candidates.

The charging station wait time timetable creation section 52 extracts, for all the charging stations managed by the system, charging schedules with the charging station to be recommended from the charging candidates for each recommendation target EV and past recommendation information on EVs already notified of a recommended charging schedule. The charging station wait time timetable creation section 52 uses the charging schedules to create a wait time timetable that reflects the charging schedules of all the EVs scheduled to be charged at the charging station.

The charging schedule determination section 53 compares the wait time timetables for the respective charging stations, which correspond to the schedules created by the charging station wait time timetable creation section 52, with one another. Based on the results of the comparison, the charging schedule determination section 53 selects one of the charging candidates which does not affect the evaluation criterion for the charging schedules. The charging schedule determination section 53 determines the selected charging candidate as a charging schedule.

The charging schedule determination section 5 deletes the other charging candidates for the EV for which the charging schedule has been determined to update the wait time timetable for each of the charging stations. The charging schedule determination section 5 executes similar procedures until a charging schedule is determined for all the recommendation target EVs.

The charging candidate calculation section 51 determines, for each of the EVs, a plurality of charging schedules including schedules that are possibly not carried out. Furthermore, the charging station wait time timetable creation section 52 creates a charging timetable including all the charging schedules. The charging schedule determination section 53 determines a real charging schedule for each EV based on the charging timetable.

The recommendation level determination section 55 evaluates output results from the charging candidate calculation section 51, the charging station wait time timetable creation section 52, and the charging schedule determination section 53 to control operations of the charging schedule determination section 53. The recommendation level determination section 55 evaluates the charging schedules calculated by the charging schedule determination section 53 based on a predetermined evaluation criterion.

When the charging schedule for an evaluation target fails to meet the evaluation criterion, the recommendation level determination section 55 changes a recommendation level, that is, changes the target EV. Moreover, the recommendation level determination section 55 changes criteria for the charging candidate calculation section 51, including a criterion for selecting charging stations and a criterion for calculating the charging time. When a charging schedule is determined again via operations of the charging candidate calculation section 51, the charging station wait time timetable creation section 52, and the charging schedule determination section 53, the recommendation level determination section 55 evaluates the charging schedule again.

Figure 2:
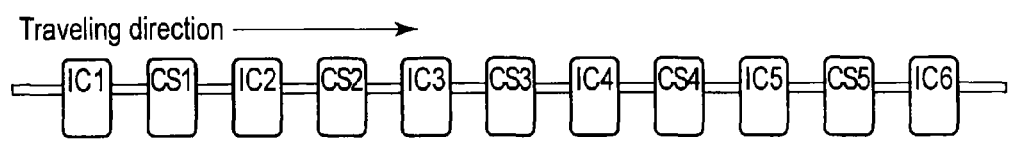
FIG. 2 is a diagram depicting an example of an expressway to which the charging station recommendation system in the embodiment is applied.

Now, a specific example of operations of the charging station recommendation system will be described taking a case of an expressway by way of example. FIG. 2 is a diagram depicting an example of an expressway to which the charging station recommendation system in the embodiment is applied.

An example will be described below in which the utilization of one of the charging stations installed on such an expressway as depicted in FIG. 2 is recommended to an EV traveling on the expressway. An example will be described below which relates to the operations of the charging candidate calculation section 51, charging station wait time timetable creation section 52, and charging schedule determination section 53 of the charging schedule determination section 5.

Furthermore, applications of the charging station recommendation system are not limited to such an expressway as depicted in FIG. 2 but may be general roads other than expressways.

On the expressway depicted in FIG. 2, interchanges (hereinafter simply referred to as ICs) are installed in order of IC1 to IC6 in a traveling direction; the interchange IC1 is closest to the EV and the interchange IC6 is farthest from the EV. Charging stations (hereinafter also simply referred to as CSs) CS1 to CS5 are installed between the interchanges. The ICs and the CSs are installed in order of IC1, CS1, IC2, CS2, IC3, CS3, IC4, CS4, IC5, CS5, and IC6 in the traveling direction; the IC1 is closest to the EV, and the IC6 is farthest from the EV.

Furthermore, on this expressway, the information collection section 4 depicted in FIG. 1 can collect location information on each EV traveling on the expressway, battery capacity information that is a full charging capacity, charging amount information that is a full charging capacity, and information on a target IC by wireless communication.

Additionally, the information collection section 4 can collect, from each of the CSs, information on the charging rate of an installed charger and information on EVs waiting for charging.

In addition, the charging schedule information notification section 6 can give instructions for execution of charging to EVs traveling on the expressway, using wireless communication or the like.

Figures 3, 4:
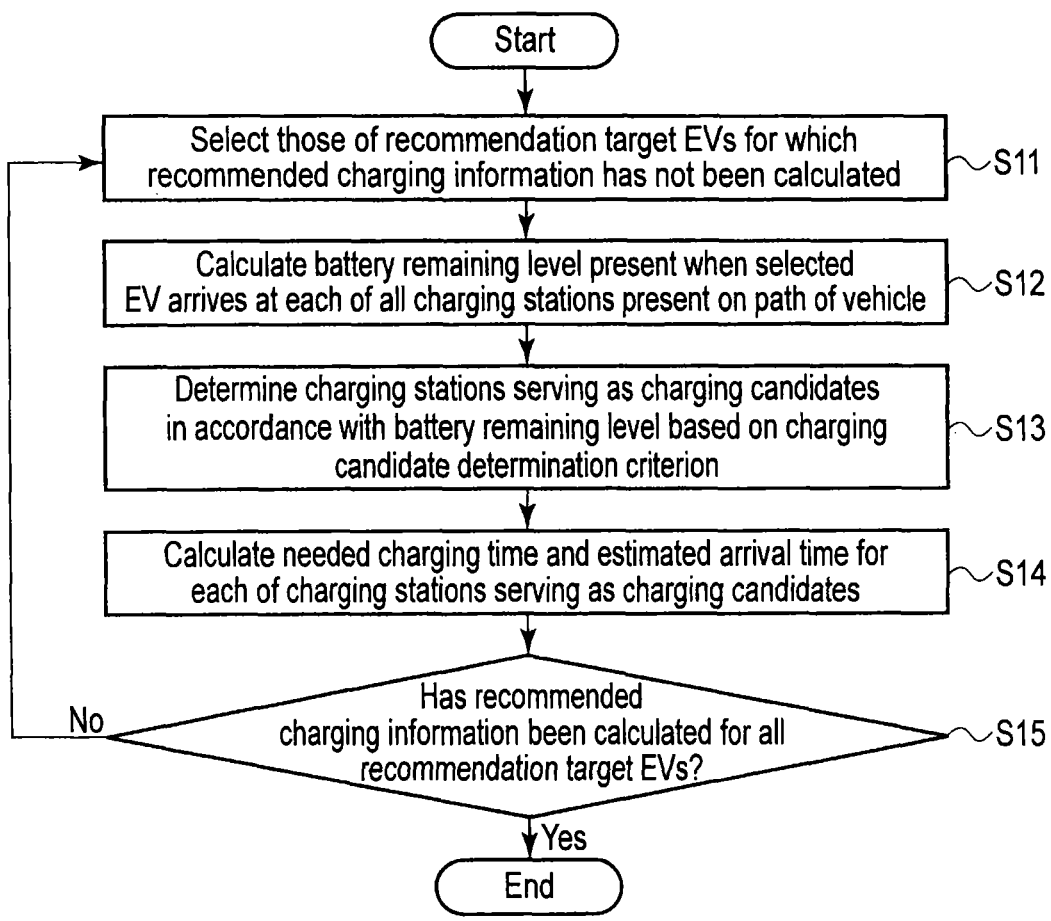
FIG. 3 is a diagram depicting an example of vehicle information on an electric vehicle in a table form.
FIG. 4 is a flowchart depicting an example of a procedure for the operations of a charging candidate calculation section 51 in the charging station recommendation system according to the embodiment.

FIG. 3 is a diagram depicting an example of vehicle information on an electric vehicle in a table form.

This vehicle information indicates that a vehicle ID is "EV3", that the current location is a point 1 kilometer away from the "IC1" up the expressway, that the target IC is the "IC6", that the current charging amount is 17 kWh, and that the battery capacity at full charging capacity is 24 kWh.

Now, operations of the charging candidate calculation section 51 will be described which are performed when the EV enters the expressway through the IC1 and the information collection section 4 collects the vehicle information depicted in FIG. 4.

FIG. 4 is a flowchart depicting an example of a procedure for the operations of the charging candidate calculation section 51 in the charging station recommendation system according to the embodiment.

First, the charging candidate calculation section 51 selects an EV included in the EVs to which the utilization of a recommendation target charging station is to be recommended and being the EV for which charging candidate information has not been calculated yet (step S11). Here, it is assumed that an EV3 is selected.

The charging candidate calculation section 51 obtains the destination of the EV3 in the vehicle information collected by the information collection section 4 and depicted in FIG. 3. Based on the destination, the charging candidate calculation section 51 picks up charging stations on a scheduled path of the EV3. Based on the current location of the EV3, map data, and the current charging amount, the charging candidate calculation section 51 calculates an estimated value for the battery remaining level obtained on assumption that the EV3 arrives at each of the charging stations on the scheduled path (step S12). The battery remaining level may be calculated by an internal inference system or by an external system or the EV itself.

FIG. 5 is a diagram depicting an example of the results of calculation of the estimated value of the battery remaining level obtained when the EV arrives at each charging station. In this example, the estimated value of the battery remaining level obtained when the EV3 arrives at the CS1 is assumed to be 80% of the full charging capacity. Furthermore, the estimated value of the battery remaining level obtained when the EV3 arrives at the CS2 is assumed to be 63% of the full charging capacity. Additionally, the estimated value of the battery remaining level obtained when the EV3 arrives at the CS3 is assumed to be 35% of the full charging capacity. In addition, the estimated value of the battery remaining level obtained when the EV3 arrives at the CS4 is assumed to be 14% of the full charging capacity. Furthermore, the estimated value of the battery remaining level obtained when the EV3 arrives at the CS4 is assumed to be 2% of the full charging capacity.

Then, the charging candidate calculation section 51 obtains a pre-specified recommendation criterion. The charging candidate calculation section 51 uses the recommendation criterion to select at least one of the charging stations on the path of the vehicle as a charging station to be designated as a charging candidate for utilization by the EV (step S13). Various recommendation criteria are possible. For example, the recommendation criteria are reasonably determined based on the viewpoint that "the battery should not be exhausted before the charging station is reached" or the viewpoint that "charging is preferably avoided while a sufficient charging amount remains", which corresponds to the intention of the driver of the EV.

In this example, the recommendation criterion is "charging stations that are the farthest and the second farthest from the current location and for which a battery remaining level of at least 5% is maintained until the charging stations are reached". The reason why the battery remaining level of at least 5% is maintained is that this battery remaining level allows prevention of exhaustion of the battery resulting from an error in estimation of the battery remaining level.

Then, the charging candidate calculation section 51 calculates an estimated arrival time and a needed charging time for the EV for each of the selected charging stations (step S14). The needed charging time is an amount of time from the start to end of charging and does not include a wait time after arrival. The arrival time may be may be inferred by a calculation executed by an internal inference system or by an external system or the EV itself.

Furthermore, the needed charging time is determined by a criterion for a predetermined charging time and the charging rate of each charging station. The criterion for the charging time may be, for example, that "charging is performed up to 80%" or that "charging is performed by an amount sufficient to allow the EV to arrive at the next charging station". After S14, when the charging candidate information has not been calculated for all the recommendation target EVs (NO in step S15), the procedure returns to S11.

FIG. 6 is a diagram depicting an example of the result of selection of a charging station performed by the charging candidate calculation section 51. FIG. 7 is a diagram depicting the results of calculation of charging candidates for the EV3 performed by the charging candidate calculation section 51.

In this example, the CS3 and the CS4 are selected as candidates for the charging station the utilization of which is to be recommended to the EV3. In this example, the estimated arrival time when the EV3 arrives at the CS3 is 83 minutes later, and the estimated value of the needed charging time at the CS3 is 13 minutes. Furthermore, in this example, the estimated arrival time when the EV3 arrives at the CS4 is 98 minutes later, and the estimated value of the needed charging time at the CS4 is 18 minutes.

Now, operations of the charging station wait time timetable creation section 52 under a predetermined condition will be described.

Under this condition, it is assumed that EVs corresponding to electric vehicle IDs "EV1", "EV2", "EV3", "EV4", "EV5", "EV6", and "EV7" are traveling on the expressway. Furthermore, it is assumed that the EV1 and EV2 were notified of charging station recommendation information before the EVs started traveling. Additionally, the remaining EVs, the EV3, the EV4, the EV5, the EV6, and the EV7 have not been notified of recommendation information.

FIG. 8 is a diagram depicting an example of charging station recommendation information reported to the EV1 and EV2, in a table form.

In the example depicted in FIG. 8, the EV1 has been notified of recommendation information indicative of recommendation of utilization of the CS3. In this example, the estimated arrival time when the EV1 arrives at the CS3 is 70 minutes later. In this example, the estimated value of the needed charging time at the CS3 is 14 minutes. Furthermore, the EV2 has been notified of recommendation information indicative of recommendation of utilization of the CS4. Additionally, the estimated arrival time when the EV2 arrives at the CS4 is 92 minutes later. In addition, the estimated value of the needed charging time at the CS4 is 16 minutes.

FIG. 9 is a diagram depicting an example of charging station recommendation information for the EV3, the EV4, the EV5, the EV6, and the EV7, in a table form. This example illustrates, in addition to the recommendation information for the EV3 already illustrated in FIG. 7, two candidates for the charging station the utilization of which is to be recommended, the candidates having been calculated by the charging candidate calculation section 51, for each of the EVs including the EV4, the EV5, the EV6, and the EV7.

FIG. 10 is a flowchart depicting an example of a procedure for the operations of the charging station wait time timetable creation section 52 in the charging station recommendation system according to the embodiment.

Now, an operation will be described which is performed by the charging station wait time timetable creation section 52 to create a wait time timetable indicative of a wait time at each point in time for the charging station CS3.

First, the wait time timetable creation section 52 extracts recommendation information recommending the charging station (in this case, the CS3) related to the timetable to be created, based on the recommendation information reported to the non-recommendation-target EVs (step S21).

One of the EVs (in this case, the EV1 and EV2 depicted in FIG. 8) notified of recommendation information that is scheduled to be charged at the CS3 related to the creation of the wait time timetable is the EV1.

Then, the wait time timetable creation section 52 extracts candidate information indicating, as a candidate, the charging station (in this case, the CS3) related to the timetable to be created, based on the charging candidate information on the recommendation target EVs selected in step S11 (step S22).

EVs included in the EVs (in this case, the EV3 to EV7 depicted in FIG. 9) to which recommendation is to be made and including the CS3 in the charging candidates are the EV3, the EV4, and the EV5.

Then, the wait time timetable creation section 52 merges information extracted in S21 and S22. The wait time timetable creation section 52 sorts the merged information in order of the arrival time as charging information on the charging station (CS3) related to the wait time timetable to be created. The wait time timetable creation section 52 performs the sorting to create charging information (step S23).

The wait time timetable creation section 52 creates a charging wait time timetable for the charging station related to the wait time timetable to be created, based on the charging information created by sorting in S23 (step S24).

The details of S24 will be described.

Figures 11, 12:
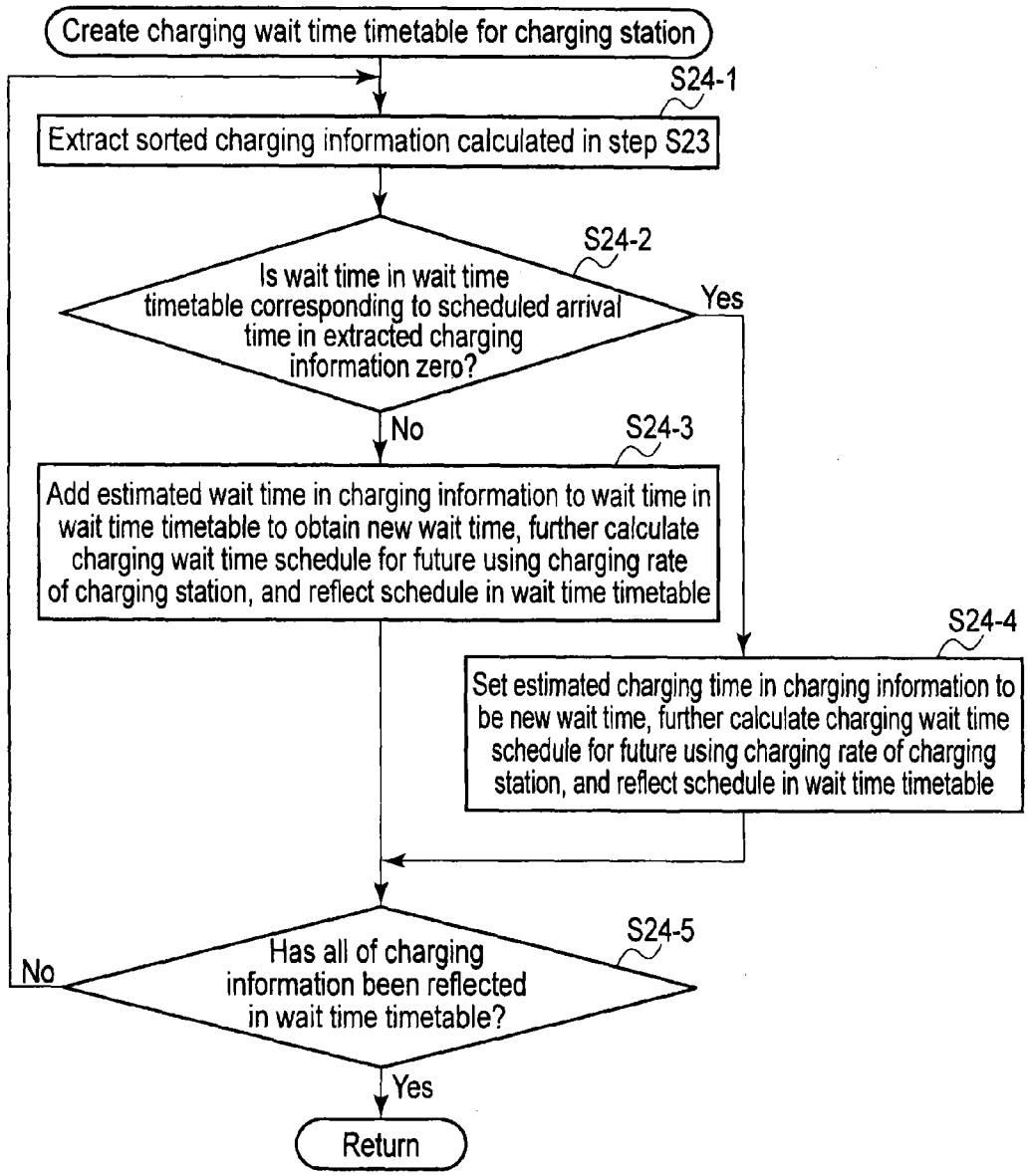
FIG. 11 is a flowchart depicting an example of a procedure for creation of a wait time timetable based on the information generated in S23.
FIG. 12 is a diagram depicting an example of the wait time timetable created by the wait time timetable creation section 52.

FIG. 11 is a flowchart depicting an example of a procedure for creation of a wait time timetable based on the information generated in S23.

First, the wait time timetable creation section 52 extracts the charging information sorted in S23, on a piece-by-piece basis (step S24-1). When the wait time in the wait time timetable corresponding to the scheduled arrival time indicated in the charging information extracted in S24-1 is not zero (NO in step S24-2), the wait time timetable creation section 52 adds the estimated charging time indicated in the charging information to the wait time in the wait time timetable to obtain a new wait time. Moreover, the wait time timetable creation section 52 uses the information on the charging rate of the charging station collected by the information collection section 4 to calculate a charging wait time in the future. The wait time timetable creation section 52 reflects the time in the wait time timetable (step S24-3).

Furthermore, when the wait time in the wait time timetable corresponding to the scheduled arrival time in the charging information extracted in S24-1 is zero (YES in step S24-2), the wait time timetable creation section 52 sets the estimated charging time indicated in the charging wait information to be a new wait time. Moreover, the wait time timetable creation section 52 uses the information on the charging rate of the charging station collected by the information collection section 4 to calculate the charging wait time in the future. The wait time timetable creation section 52 reflects the calculated time in the wait time timetable (step S24-4).

After the processing in S24-3 or S24-4, if all of the charging information is reflected in the wait time timetable (YES in step S24-5), the wait time timetable creation section 52 ends the processing in step S24. When not all of the charging information has been reflected in the wait time timetable (NO in step S24-5), the wait time timetable creation section 52 returns to the processing in step S24-1.

FIG. 12 is a diagram depicting an example of the wait time timetable created by the wait time timetable creation section 52. The wait time timetable depicted in FIG. 12 depicts the wait time for the CS3 at intervals of 5 minutes from 70 minutes later to 130 minutes later. The wait timetable creation section 52 may actually calculate the wait time, for example, at an interval of 1 minute and store the calculated wait time in the internal memory.

FIG. 13 is a diagram depicting the wait time timetable created for the CS3 by the wait time timetable creation section 52, in a graph form.

FIG. 13 depicts the wait time timetable for the CS3 and the charging information for the EVs scheduled to be charged at the CS3. The graph depicts the charging information for the EV1 to which charging at the CS3 has already been recommended (see FIG. 8) and the EV3, EV4, and EV5 for which the CS3 is a candidate for a recommended charging station for charging (see FIG. 9).

The graph depicted in FIG. 13 indicates the wait time on the axis of ordinate and the point in time on the axis of abscissas. The wait time decreases over time. Thus, the wait time for each EV is represented by a triangle with a diagonal line extending from the upper left to the lower right. A series of triangles expresses the wait time for all the charging stations. The arrival time of an EVx is denoted by ax. A charging start time for the EVx is denoted by sx. A charging end time for the EVx is denoted by ex.

If, when the EV arrives at a charging station, no EV is being charged at the charging station, the arrival time is the same as the charging start time. Furthermore, if another EV is being charged or is waiting for charging at the charging station, the timing when the arriving EV starts being charged is the timing when the other EV being charged or waiting for charging at the time of the arrival completes being charged.

In the example depicted in FIG. 13, when the EV1 arrives at the CS3, no EV is being charged at the CS3. Thus, the arrival time a1 of the EV1 is the same as the charging start time s1 for the EV1 (point in time: 70).

Furthermore, at the time when the EV3 is to arrive at the CS3 (point in time: 82), the EV1 is expected to be still being charged. Thus, the arrival time a3 of the EV3 (point in time: 82) is different from the charging start time s3 for the EV3 (point in time: 84).

Furthermore, the charging start time s3 is the same as the charging end time e1 for the EV1 (point in time: 84).

FIG. 14 is a diagram depicting the wait time timetable created by the wait time timetable creation section 52, in a graph form.

The graph depicted in FIG. 14 is a graphic expression of a wait time timetable for the CS4 created by the wait time timetable creation section 52 based on the information depicted in FIG. 8 and FIG. 9.

FIG. 14 depicts the wait time timetable for the CS4 and the charging information for the EVs scheduled to be charged at the CS4. The graph depicts the charging information for the EV2 to which charging at the CS4 has already been recommended (see FIG. 8) and the EV3, EV4, and EV5 for which the CS3 is a candidate for a recommended charging station for charging (see FIG. 9).

In the example depicted in FIG. 14, when the EV2 arrives at the CS4, no EV is already being charged at the CS4. Thus, the arrival time a2 of the EV2 is the same as the charging start time s2 for the EV2 (point in time: 92).

On the other hand, at the time when the EV3 is to arrive at the CS4 (point in time: 98), the EV2 is expected to be still being charged. Thus, the arrival time a3 of the EV3 (point in time: 98) is different from the charging start time s3 for the EV3 (point in time: 118). The charging start time s3 is the same as the charging end time e1 for the EV2 (point in time: 118).

Now, operations of the charging schedule determination section 53 will be described which are preformed when wait time timetables are provided, which are related to the CS3 and the CS4 and depicted in FIG. 13 and FIG. 14. When the wait time timetables are created by the wait time timetable creation section 52 based on the charging schedules (recommendation information) and charging candidate information depicted in FIG. 8 and FIG. 9, wait time timetables for the CS1, the CS2, the CS5, and the CS6 are also created. For simplification of description, it is assumed that only the wait time timetables for the CS3 and the CS4 are created.

Figure 15:
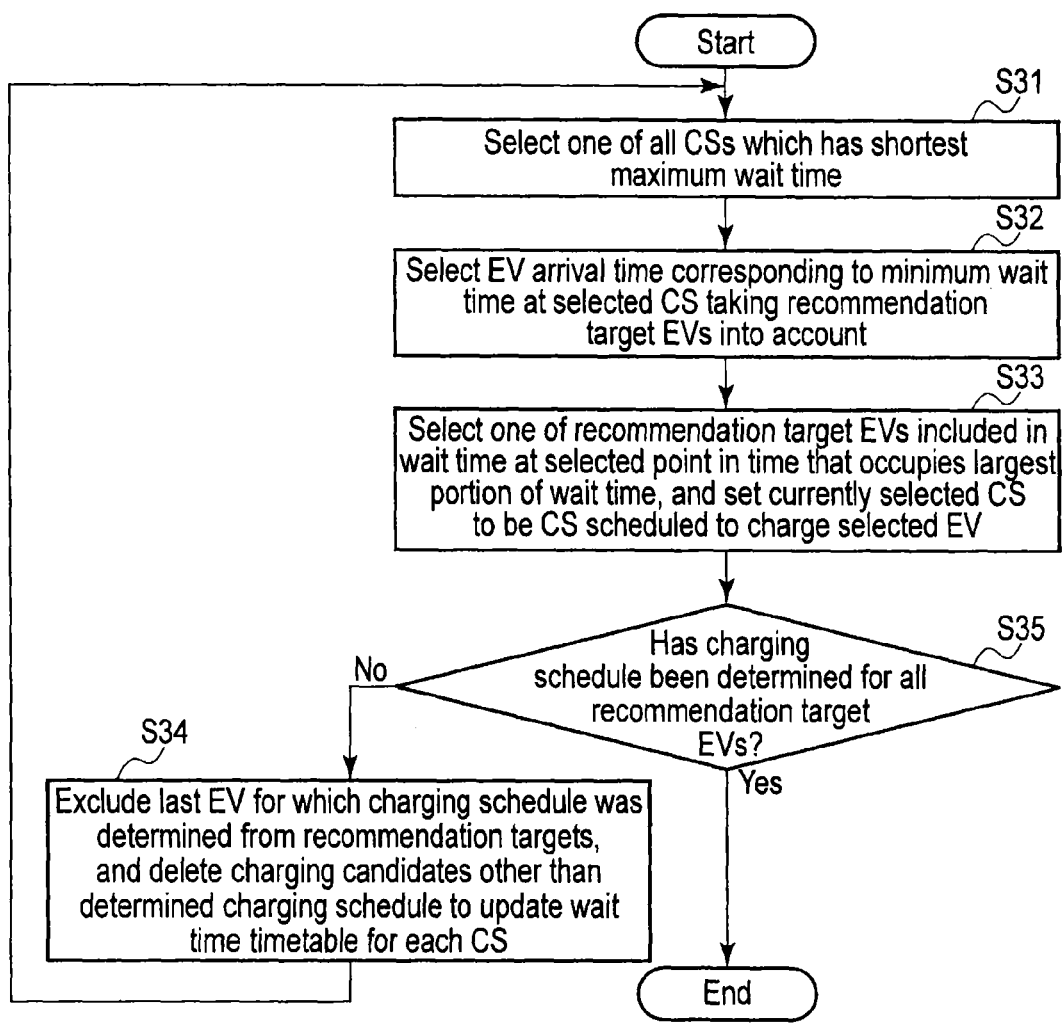
FIG. 15 is a flowchart depicting an example of a procedure for operations of the charging schedule determination section 53.

FIG. 15 is a flowchart depicting an example of a procedure for operations of the charging schedule determination section 53.

When the wait time timetable for the CS3 depicted in FIG. 13 and the wait time timetable for the CS4 depicted in FIG. 14 are created, the charging schedule determination section 53 first compares the maximum wait times in the two wait time timetables with each other to select the CS with the shortest maximum wait time (step S31).

The maximum wait time in the wait time timetable for the CS3 depicted in FIG. 13 is 28 at the arrival time of the EV5. The maximum wait time in the wait time timetable for the CS4 depicted in FIG. 14 is 39 at the arrival time of the EV4. Thus, the CS3 is selected as the CS with the shortest maximum wait time.

Then, based on the wait time timetable for the CS3, which is the CS selected in S31, the charging schedule determination section 53 selects the EV arrival time corresponding to the minimum wait time at the CS3 taking the recommendation target EVs into account (step S32). The EV arrival time means one of the wait times depicted in the wait time timetables which corresponds to the minimum wait time.

The EV arrival times corresponding to the wait times at the CS3 are s3 (wait time: 14, point in time 70), a3 (wait time: 15, point in time 70), a4 (wait time: 21, point in time 88), and a5 (wait time: 28, point in time 96). However, only the EV1, which is not a future recommendation target, is related to the point in time s1, and thus, the charging schedule determination section 53 excludes the point in time s1 and selects a3 as the EV arrival time.

Then, the charging schedule determination section 53 selects one of the recommendation target EVs included in the wait time at the EV arrival time corresponding to the minimum wait time selected in S32 that occupies the largest portion of the wait time. The charging schedule determination section 53 sets the currently selected CS to be a CS scheduled to charge the selected EV (step S33).

The recommendation target EV of the EVs related to the wait time at the point in time a3 corresponding to the EV arrival time selected in S32 as described above is the EV3. Thus, as recommended charging information for the EV3, a candidate with the charging station SC3, that is, one of the charging candidates depicted in FIG. 9 and corresponding to a "candidate 1", is selected.

Then, the charging schedule determination section 53 determines the CS3 to be the charging schedule for the EV3 to determine the recommended charging information for the EV3. Moreover, when the charging schedule has not been determined for all of the recommendation target EVs (NO in step S35), the charging schedule determination section 53 excludes the last EV for which the charging schedule was determined, from the recommendation targets. Furthermore, the charging schedule determination section 53 deletes the charging candidates other than the determined charging schedule to update the charging wait time timetable for each CS (step S34).

Specifically, the charging schedule determination section 53 deletes the charging schedules for a "candidate 2" for the EV3 in FIG. 9, that is, the charging schedules for the CS4, as the charging candidates other than the already determined charging schedule, to update the charging timetables.

Although omitted on the flowchart for simplification, the charging station wait time timetable creation section 52 is actually executed again.

Figure 16:
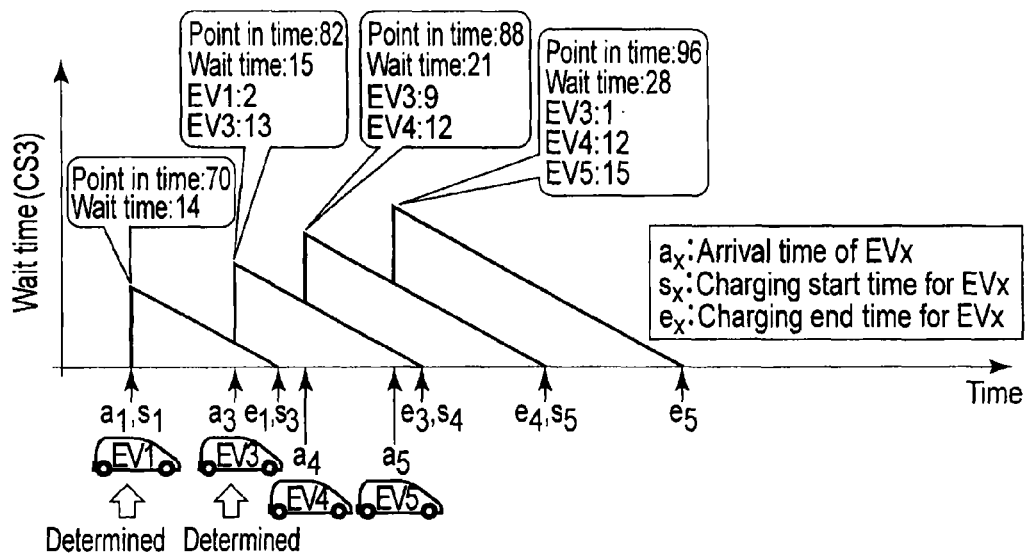
FIG. 16 is a diagram depicting the wait time timetable for the CS3 resulting from determination of the recommended charging information for the EV3, in a graph form.

FIG. 16 is a diagram depicting the wait time timetable for the CS3 resulting from the determination of the recommended charging information for the EV3, in a graph form.

Figure 17:
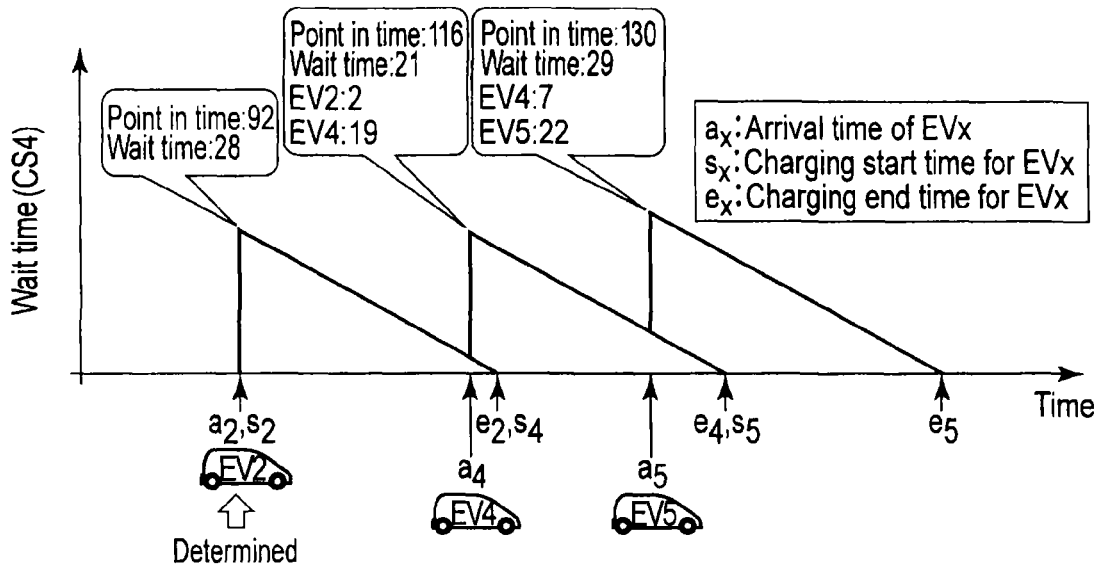
FIG. 17 is a diagram depicting the wait time timetable for a CS4 resulting from the determination of the recommended charging information for the EV3, in a graph form.

FIG. 17 is a diagram depicting the wait time timetable for the CS4 resulting from the determination of the recommended charging information for the EV3, in a graph form.

After the recommended charging information for the EV3 is determined, the charging schedule determination section 53 selects one of the charging stations CS3 and CS4 that has the shortest maximum wait time.

The maximum wait time in the wait time timetable for the CS3 depicted in FIG. 16 is 28 at the time of arrival of the EV5. The maximum wait time in the wait time timetable for the CS4 depicted in FIG. 17 is 29 at the time of arrival of the EV5. Thus, the CS3 is selected as a CS with the shortest maximum wait time.

Then, the charging schedule determination section 53 selects, from the wait time timetable for the CS3, an EV arrival time corresponding to the minimum wait time that is appropriate when the recommendation target EVs are taken into account.

The EV arrival times corresponding to the wait times at the CS3 are s1, a3, a4, and a5. However, only the EV1, which is not a recommendation target, is related to the point in time s1, and thus, the charging schedule determination section 53 excludes the point in time s1. Moreover, as only the EV1, which is not a recommendation target, and the EV2, for which a recommendation has already been determined (that is, the EV2 is not a recommendation target), are related to the point in time a3, the charging schedule determination section 53 excludes the point in time a3. The charging schedule determination section 53 selects a4 (wait time: 21, point in time: 88) from the remaining point in time a4 and a5, as the EV arrival time.

The recommendation target EV related to the wait time at the point in time a4 selected as the EV arrival time is the EV4. Thus, the charging schedule determination section 53 selects a candidate with the charging station CS3, that is, the charging candidate corresponding to the "candidate 1" in the charging candidates depicted in FIG. 9, as recommended charging information for the EV4.

Then, the charging schedule determination section 53 determines the CS3 to be the charging schedule for the EV4 to determine the recommended charging information for the EV4. Moreover, the charging schedule determination section 53 deletes the "candidate 2" for the EV4, that is, the charging schedule of charging at the CS4, as a charging candidate included in the charging candidates depicted in FIG. 9 and determined not to be scheduled for charging. Thus, the wait time timetable is updated.

Figure 18:
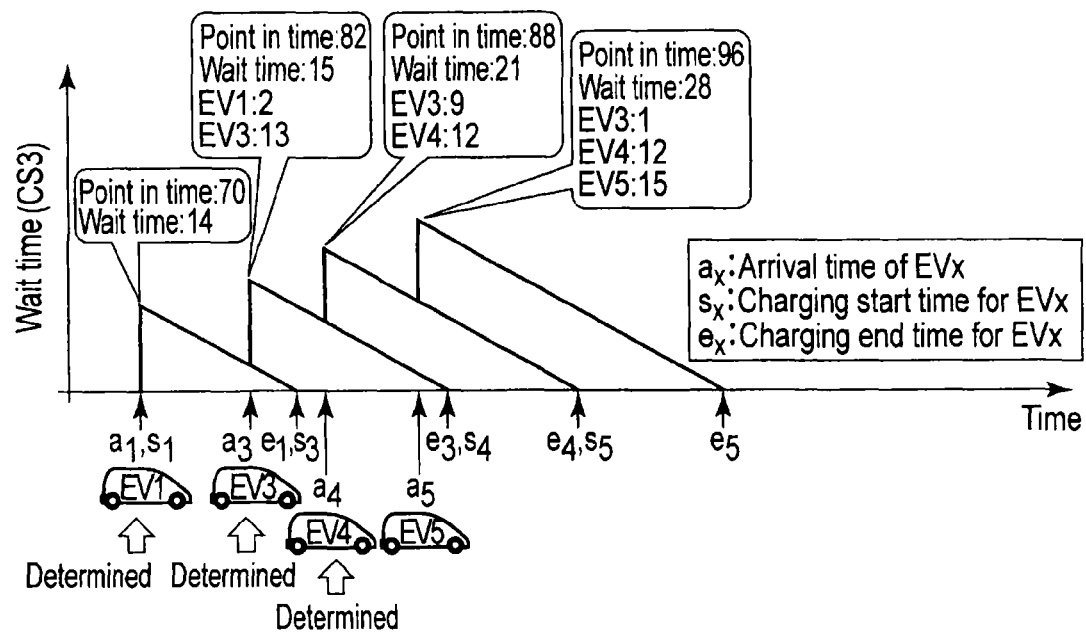
FIG. 18 is a diagram depicting the wait time timetable for the CS3 resulting from determination of the recommended charging information for the EV3 and the EV4, in a graph form.

FIG. 18 is a diagram depicting the wait time timetable for the CS3 resulting from determination of the recommended charging information for the EV3 and the EV4, in a graph form.

Figure 19:
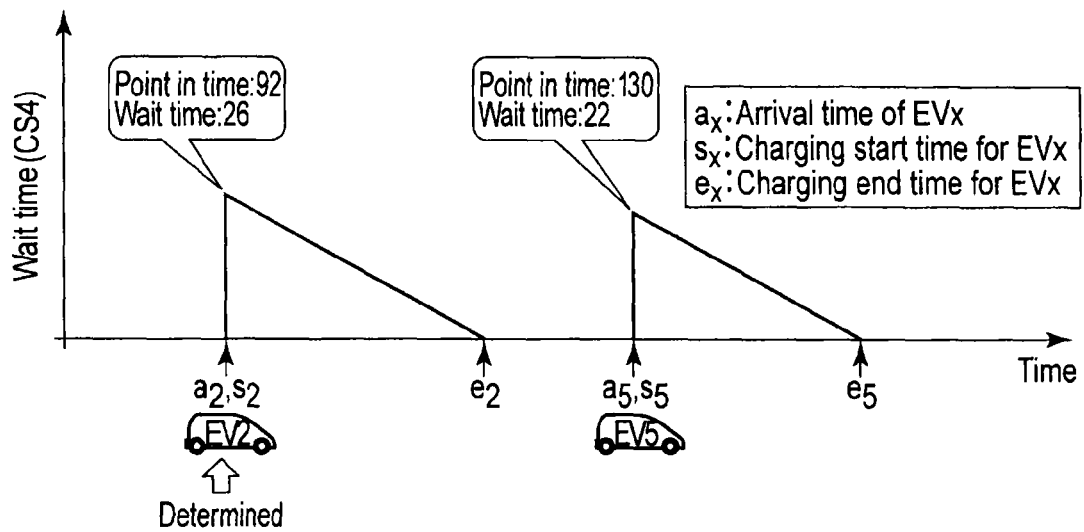
FIG. 19 is a diagram depicting the wait time timetable for the CS4 resulting from determination of the recommended charging information for the EV3 and the EV4, in a graph form.

FIG. 19 is a diagram depicting the wait time timetable for the CS4 resulting from determination of the recommended charging information for the EV3 and the EV4, in a graph form.

After the recommended charging information for the EV3 and the EV4 has been determined, the charging schedule determination section 53 selects one of the CS3 and the CS4 which has the shortest maximum wait time.

The maximum wait time in the wait time timetable for the CS3 depicted in FIG. 18 is 28 at the time of arrival of the EV5. The maximum wait time in the wait time timetable for the CS4 depicted in FIG. 19 is 22 at the time of arrival of the EV5. Thus, the charging schedule determination section 53 selects the CS4 as a CS with the shortest maximum wait time.

Then, the charging schedule determination section 53 selects, from the wait time timetable for the CS4, an EV arrival time corresponding to the minimum wait time that is appropriate when the recommendation target EVs are taken into account.

The EV arrival times at the CS4 are a2 and a5. However, only the EV2, which is not a recommendation target, is related to the point in time a2, and thus, the charging schedule determination section 53 excludes the point in time s2. The charging schedule determination section 53 selects a2 (wait time: 22, point in time: 130) as the EV arrival time.

The recommendation target EV related to the wait time at the point in time a5 selected as the EV arrival time is the EV5. Thus, the charging schedule determination section 53 selects a candidate with the charging station CS4, that is, the charging candidate corresponding to the "candidate 2" in the charging candidates depicted in FIG. 9, as recommended charging information for the EV5.

Then, the charging schedule determination section 53 determines the CS4 to be the charging schedule for the EV5 to determine the recommended charging information for the EV5. Moreover, the charging schedule determination section 53 deletes the "candidate 1" for the EV5, that is, the charging schedule of charging at the CS3, as a charging candidate included in the charging candidates depicted in FIG. 9 and determined not to be scheduled for charging. Thus, the wait time timetable is updated.

Figure 20:
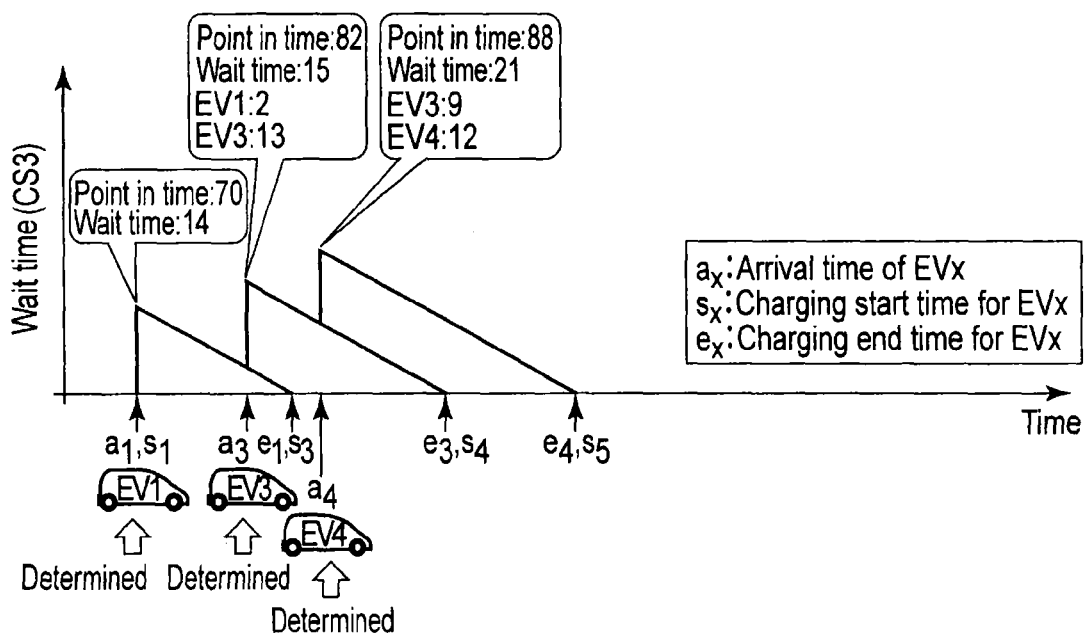
FIG. 20 is a diagram depicting the wait time timetable for the CS3 resulting from determination of the recommended charging information for the EV3, the EV4, and the EV5, in a graph form.

FIG. 20 is a diagram depicting the wait time timetable for the CS3 resulting from determination of the recommended charging information for the EV3, the EV4, and the EV5, in a graph form.

Figures 21, 22:
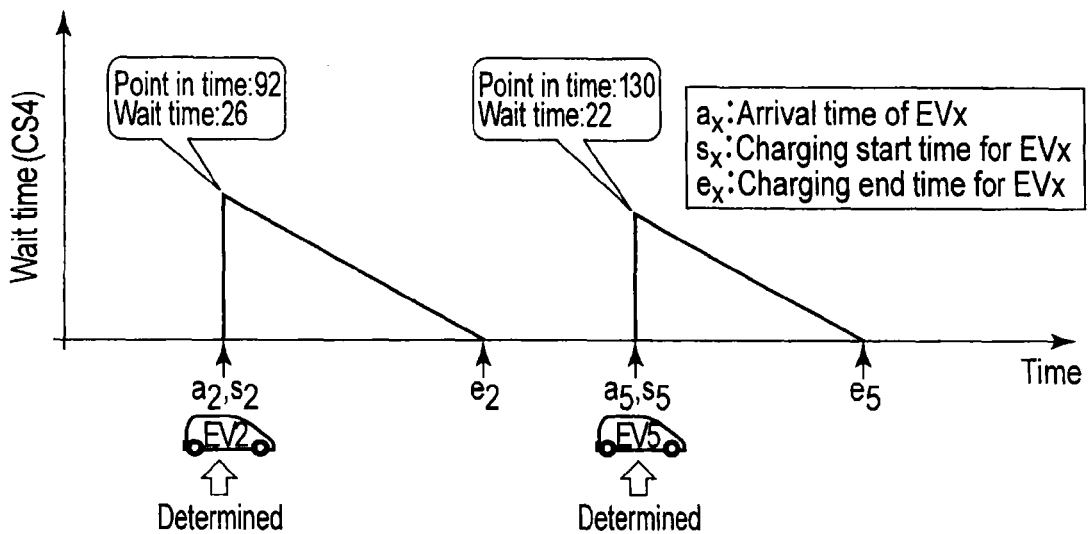
FIG. 21 is a diagram depicting the wait time timetable for the CS4 resulting from determination of the recommended charging information for the EV3, the EV4, and the EV5 in a graph form.
FIG. 22 is a diagram depicting an example of a determined charging schedule in a table form.

FIG. 21 is a diagram depicting the wait time timetable for the CS4 resulting from determination of the recommended charging information for the EV3, the EV4, and the EV5 in a graph form.

FIG. 22 is a diagram depicting an example of a determined charging schedule in a table form.

FIG. 21 and FIG. 22 are wait time timetables for the CS3 and the CS4 resulting from determination of recommendations for the EV3, the EV4, and the EV5, that is, resulting from completion of recommendations for all the recommendation target EVs. That is, for the EV3, the EV4, and the EV5, the results of the charging station CS3, an arrival time of 82 minutes later, and a recommended charging time of 13 minutes are obtained, for the EV3, from the charging targets depicted in FIG. 9, as depicted in FIG. 22. Furthermore, the results of the charging station CS3, an arrival time of 88 minutes later, and a recommended charging time of 12 minutes are obtained for the EV4. Additionally, the results of the charging station CS4, an arrival time of 130 minutes later, and a recommended charging time of 21 minutes are obtained for the EV4.

Now, operations of the recommendation level determination section 55 will be described.

FIG. 23 is a flowchart depicting an example of a procedure for the operations of the recommendation level determination section 55 of the charging station recommendation system according to the embodiment.

First, the recommendation level determination section 55 acquires charging schedule information as the output results from the charging candidate calculation section 51, the wait time timetable creation section 52, and the charging schedule determination section 53 (step S51).

Then, the recommendation level determination section 55 determines whether or not the results for the wait time at the charging station in the charging schedule information acquired in S51 meet a predetermined evaluation criterion (step S52). FIG. 24 is an example of evaluation criteria for the results for the wait time at the charging station. FIG. 24 depicts four types of evaluation criteria with criterion names "maximum wait time CS", "maximum wait time EV", "inter-CS wait time standard deviation", and "inter-EV wait time standard deviation". The recommendation level determination section 55 selects one of these evaluation criteria.

When the results for the wait time at the charging station in the charging schedule information acquired in S51 do not meet the predetermined evaluation criterion (NO in step S52), the recommendation level determination section 55 increases a recommendation level to the next level. In accordance with this level, the recommendation level determination section 55 resets conditions for calculation of the charging schedule information in the charging candidate calculation section 51, the wait time timetable creation section 52, and the charging schedule determination section 53 (step S53). This setting is the setting of charging conditions and the range of recommendation target EVs.

FIG. 25 is a diagram depicting an example of selection criteria for the recommendation target EVs and determination criteria for the charging candidates with respect to the recommendation level, in a table form.

The determination criteria depicted in FIG. 25 includes the selection criteria for the recommendation target EVs and the determination criteria for the charging candidates which are specified with respect to 10 recommendation levels. In this case, by way of example, a determination criterion for a charging candidate with a low recommendation level is a criterion that attaches a higher value to the convenience of EV drivers (for example, a smaller number of charging operations needed) than to the shortness of the charging time needed for an EV to use a charging station once. In contrast, a determination criterion for a charging candidate with a high recommendation level is a criterion that attaches a higher value to the shortness of the charging time needed for an EV to use a charging station once than to the convenience of EV drivers.

The recommendation level may be determined using at least one of the criterion that attaches a higher value to the convenience of EV drivers than to the shortness of the charging time and the criterion that attaches a higher value to the shortness of the charging time than to the convenience of EV drivers. Alternatively, both criteria may be used to comprehensively determine the recommendation level.

In the example depicted in FIG. 25, at a higher recommendation level, one charging operation for an EV needs a reduced charging time, and the results for the wait time at the charging station are more likely to meet the predetermined evaluation criterion.

The criteria depicted in FIG. 25 are selection criteria for the recommendation target EVs and determination criteria for the charging candidates with respect to the recommendation level in the case where the criterion corresponding to the criterion name "maximum wait time CS" depicted in FIG. 24 is selected.

Thus, for a section "Charging time" in "Determination criteria for charging candidates" in the criteria depicted in FIG. 25, a condition is set which assumes that a charging station is present which has been determined to be rejected in the evaluation based on " . . . for EVs assigned to charging stations failing to meet the criterion in the last evaluation" (". . ." is a specific condition described in the section "charging time" in FIG. 25).

This leads to a change in the above-described conditions "charging stations that are the farthest and the second farthest from the current location and for which a battery remaining level of at least 5% is maintained".

Now, operations of the notification time control section 61 of the charging schedule information notification section 6 will be described.

Figures 26, 27:
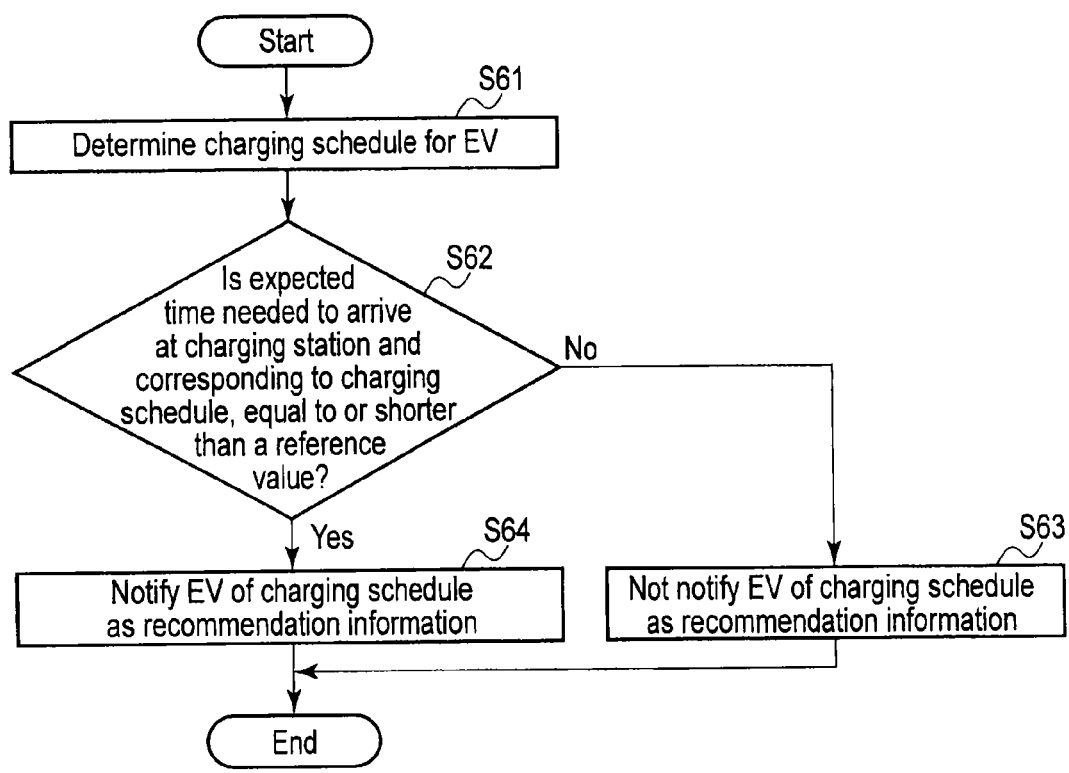
FIG. 26 is a diagram depicting an example of a charging schedule reported as a recommendation, in a table form.
FIG. 27 is a flowchart depicting an example of a procedure for the operations of the notification time control section 61 of the charging schedule information notification section 6 of the charging station recommendation system according to the embodiment.

FIG. 26 is a diagram depicting an example of a charging schedule reported as a recommendation, in a table form.

Information input to the notification time control section 61 is information on the charging schedule as an output result from the charging schedule determination section 5. In this case, it is assumed that, for the EV1, the provided information is a charging schedule input with the charging station CS2, an arrival time of 24 minutes later, and a recommended charging time of 13 minutes, as depicted in FIG. 26. It is also assumed that, for the EV2, the provided information is a charging schedule input with the charging station CS3, an arrival time of 54 minutes later, and a recommended charging time of 12 minutes. It is further assumed that, for the EV3, the provided information is a charging schedule input with the charging station CS4, an arrival time of 68 minutes later, and a recommended charging time of 21 minutes.

FIG. 27 is a flowchart depicting an example of a procedure for the operations of the notification time control section 61 of the charging schedule information notification section 6 of the charging station recommendation system according to the embodiment.

When a charging schedule for a certain EV is determined by the charging schedule determination section 5 (step S61) and an expected time needed for arrival is 30 minutes from the current time, which is a reference value (YES in step S62), then the notification time control section 61 notifies only EVs with an arrival time of at most 30 minutes of the charging schedule (step S64). In the example depicted in FIG. 26, only the EV1 is notified of the charging schedule.

On the other hand, when the expected time needed for arrival exceeds 30 minutes from the current point in time, which is a reference value (NO in step S62), the notification time control section 61 does not report the charging schedule to the EV2 and the EV3 in the example depicted in FIG. 26, which have an arrival time of more than 30 minutes. The notification time control section 61 waits until the next opportunity for notification (step S63).

The reference value in S62 is a reference value allowing specification of how many minutes before arrival at a charging station the notification is to be started when the EV is to be guided to the charging station.

Normally, the charging station recommendation system does not change charging information after a recommendation has been reported in the charging information (an exception may occur depending on the recommendation level as in the case of the conditions described in FIG. 15). Thus, the charging schedule determination section 5 determines EVs notified of a recommendation to be non-recommendation-target EVs for which the charging schedule has already been determined.

When many of the traveling EVs are recommendation target EVs, the algorithm contains an increased number of choices for the charging schedule determination section 5. This increases the possibility of being able to obtain a better charging schedule. Thus, delaying the notification of a recommendation results in the appropriate recommendation.

However, in view of the psychological fatigue of the driver of each EV and operational safety, the charging schedule is preferably recommended early. Hence, setting a reference value to control a notification time allows the notification time to be maximally delayed with the needed earliness of a recommendation time maintained.

As described above, the charging station recommendation system according to the present embodiment selects such charging candidates as equalize the charging wait time at each charging station based on a plurality of charging candidates for all the EVs to which a charging station is to be recommended. This enables determination of such a charging schedule for each EV as is appropriate for all the EVs within the range of management.

Furthermore, in the charging management system according to the present embodiment, when a charging schedule determined based on charging candidates selected under a certain condition does not meet a predetermined criterion, a more appropriate charging schedule can be determined for each EV by re-determining a condition for the criterion.

Additionally, in the charging management system according to the present embodiment, the time of notification of a recommendation is delayed to maximally increase the number of EVs to which a charging station is to be recommended, thus increasing the number of choices for a combination of a recommendation target EV and a charging station the utilization of which is to be recommended. Thus, a more appropriate charging schedule can be determined for each EV.

Each of these embodiments can provide a charging management system that enables each of a plurality of electric vehicles to be urged to appropriately utilize charging facilities.

While a certain embodiment has been described, this embodiment has been presented by way of example only, and is not intended to limit the scope of the inventions. Indeed, the novel embodiment described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging management system comprising:
   a vehicle information collection section configured to collect vehicle information including a battery remaining level, a current location, and a destination for each of a plurality of electric vehicles;
   a facility information collection section configured to collect facility information including locations of charging facilities for the electric vehicles on a road;
   a calculation section configured to:
   (a) calculate, for each of the electric vehicles, a time of arrival at each of the charging facilities related to a path to the destination and an estimated value for the battery remaining level in a case of arrival at the charging facility, based on the information collected by the vehicle information collection section and the information acquired by the facility information collection section, and
   (b) calculate, based on the calculated battery remaining level, candidates for a charging facility utilization of which is to be recommended which are included in the charging facilities related to the path to the destination of each of the electric vehicles and an estimated duration from a time when an electric vehicle having arrived at each of the charging facilities starts charging and until the charging is complete;

a determination section configured to determine the charging facility the utilization of which is to be recommended to be one of the charging facilities related to the path to the destination which has a shortest maximum wait time from a time when the plurality of electric vehicles arrive at the charging facility until the charging is complete, based on a determination result from the calculation section; and a notification system configured to report information indicative of the charging facility determined by the determination section to the electric vehicle not having arrived at the charging facility.

2. The charging management system according to claim 1, wherein the notification section reports the information indicative of the charging facility determined by the determination section to the electric vehicle not having arrived at the charging facility, after a point in time that is a predetermined time before a point in time when the electric vehicle is expected to arrive at the charging facility.

3. The charging management system according to claim 1, wherein the determination section determines the charging facility the utilization of which is to be recommended based on:

(a) a criterion that attaches a higher value to convenience of a driver of the electric vehicle than to shortness of a charging time needed for the EV to use the charging station once, or (b) a criterion that attaches a higher value to the shortness of the charging time needed for the EV to use the charging station once than to the convenience of the driver of the EV, and wherein the determination section determines the charging facility the utilization of which is to be recommended based on:

(c) a criterion that attaches a higher value to the shortness of the charging time needed for the EV to use the charging station once than to the convenience of the driver of the EV, when, for the charging facility related to each of the plurality of electric vehicles and related to the path to the destination, a condition for a maximum wait time after the electric vehicle arrives at the charging facility, the condition being based on the calculation result from the calculation section, exceeds a predetermined value, so as to reduce the maximum wait time.

* * * * *